(12) United States Patent
Yang

(10) Patent No.: US 12,532,205 B2
(45) Date of Patent: Jan. 20, 2026

(54) METHOD AND APPARATUS FOR SENDING BEAM REPORT, METHOD AND APPARATUS FOR RECEIVING BEAM REPORT, AND ELECTRONIC DEVICE

(71) Applicant: VIVO MOBILE COMMUNICATION CO., LTD., Dongguan (CN)

(72) Inventor: Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 475 days.

(21) Appl. No.: 18/150,872

(22) Filed: Jan. 6, 2023

(65) Prior Publication Data

US 2023/0164614 A1 May 25, 2023

Related U.S. Application Data

(63) Continuation of application No. PCT/CN2021/105406, filed on Jul. 9, 2021.

(30) Foreign Application Priority Data

Jul. 9, 2020 (CN) .......................... 202010658814.X

(51) Int. Cl.
 H04W 24/10 (2009.01)
 H04L 5/00 (2006.01)
(52) U.S. Cl.
 CPC ........... H04W 24/10 (2013.01); H04L 5/0048 (2013.01)
(58) Field of Classification Search
 CPC ... H04W 24/10; H04L 5/0048; H04B 7/06956
 See application file for complete search history.

(56) References Cited

U.S. PATENT DOCUMENTS

2019/0116605 A1* 4/2019 Luo .................. H04W 72/0446
2020/0128421 A1* 4/2020 Yang .................... H04W 64/00
2022/0174719 A1* 6/2022 Zhang ............... H04W 52/0245
(Continued)

FOREIGN PATENT DOCUMENTS

CN      110838862 A      2/2020
EP       3644522 A1 *    4/2020    ........... H04B 7/0626
JP      2019-531637 A   10/2019
(Continued)

OTHER PUBLICATIONS

European Patent Office, Extended European Search Report issued in corresponding Application No. EP 21837964 dated Nov. 29, 2023.
(Continued)

*Primary Examiner* — Deepa Belur
(74) *Attorney, Agent, or Firm* — Stites & Harbison, PLLC; Jeffrey A. Haeberlin

(57) ABSTRACT

This application discloses a method and an apparatus for sending a beam report, a method and an apparatus for receiving a beam report, and an electronic device. The method for sending a report beam is applied to a terminal, and the method includes: receiving configuration information of a beam report sent by a network side device; and reporting a beam report to the network side device based on the configuration information, where each of the beam reports is corresponding to one antenna panel of the terminal.

19 Claims, 4 Drawing Sheets

(56) References Cited

U.S. PATENT DOCUMENTS

2023/0030859 A1* 2/2023 Yang .................... H04B 7/0695
2023/0042336 A1* 2/2023 Matsumura .......... H04B 7/0404

FOREIGN PATENT DOCUMENTS

WO     2018/121342 A1    7/2018
WO     2019/193581 A2   10/2019
WO     2020/083628 A1    4/2020

OTHER PUBLICATIONS

China National Intellectual Property Administration, International Search Report issued in corresponding Application No. PCT/CN2021/105406, dated Oct. 11, 2021.
3GPP TSG-RAN WG1 #89. Hangzhou, China, May 15-19, 2017. R1-1708682. Ericsson. Further results on beam management without beam indication. For relevance, see: ISR.
3GPP TSG RAN WG1 #97. Reno, USA, May 13-17, 2019. R1-1906160. Vivo. Further discussion on Multi-Beam Operation. For relevance, see: ISR.
3GPP TSG RAN WG1 Meeting #88. Athens, Greece, Feb. 13-17, 2017. ZTE, ZTE Microelectronics. UE reporting for beam management. For relevance, see: ISR.

* cited by examiner

METHOD AND APPARATUS FOR SENDING BEAM REPORT, METHOD AND APPARATUS FOR RECEIVING BEAM REPORT, AND ELECTRONIC DEVICE

CROSS-REFERENCE TO RELATED APPLICATIONS

This application is a continuation of International Application No. PCT/CN2021/105406, filed on Jul. 9, 2021, claims priority to Chinese Patent Application No. 202010658814.X filed in China on Jul. 9, 2020, which are incorporated herein by reference in their entireties.

TECHNICAL FIELD

This application relates to the field of communications technologies, and in particular, to a method and an apparatus for sending a beam report and an electronic device.

BACKGROUND

As for user equipment (UE) with a plurality of antenna panels, only one antenna panel may be activated, or a plurality of antenna panels may be activated simultaneously. However, to save energy, it is also possible to activate only one antenna panel to communicate with the network for the UE that supports simultaneous activation of a plurality of antenna panels.

When the UE sends a beam report to the network after performing beam measurement by using a plurality of antenna panels, an SSB resource indicator (SSBRI) and/or CSI-RS resource indicator (CRI) carried in the beam report may be corresponding to beams with better performance measured by using different antenna panels. In this case, if antenna panel information corresponding to each SSBRI and/or CRI, such as an antenna panel ID, is added to the beam report, the signaling overhead of reporting may be increased; and if the antenna panel information is not carried, the network will not learn a correspondence between the SSBRI and/or the CRI in beam report and the antenna panel of the UE. In subsequent data transmission, when the UE activates only one antenna panel to save power, if beam information indicated by the network when scheduling a channel is exactly beam information obtained based on an SSBRI and/or CRI measured and reported by using a currently inactive antenna panel of the UE, the UE needs a relatively large delay to switch the antenna panel, that is, to deactivate the current antenna panel and activate another antenna panel. However, a time offset for the network to schedule a channel may not be enough to meet a delay requirement of antenna panel switching, which results in interruption of data transmission between the network and the UE.

SUMMARY

According to a first aspect of this application, a method for sending a beam report, applied to a terminal, is provided, which includes:
receiving configuration information of a beam report sent by a network side device; and
reporting a beam report to the network side device based on the configuration information, where each of the beam reports is corresponding to one antenna panel of the terminal.

In some embodiments, a reportQuantity in the configuration information is set to any of the following: cri-RSRP, ssb-Index-RSRP, csi-SINR, and ssb-Index-SINR.

In some embodiments, each of the beam reports is a beam report in each beam report instance.

In some embodiments, the configuration information includes association information of at least two beam reports.

In some embodiments, the configuration information satisfies at least one of the following:
the configuration information includes information about the beam report and information about another beam report associated with the beam report;
the configuration information includes first reference signal resource configuration information associated with the beam report and second reference signal resource configuration information associated with the another beam report;
reference signal resource configuration information associated with the configuration information includes second reference signal resource configuration information associated with the first reference signal resource;
the configuration information includes uplink channel resources having an association relationship, and the uplink channel resources are used for transmitting the beam report and the another beam report; and
in the configuration information, at least two beam reports corresponding to a same index or identifier are associated, or at least two beam reports corresponding to different indexes or identifiers are associated.

In some embodiments, that the configuration information includes information about the beam report and information about another beam report associated with the beam report is:
the configuration information includes report configuration identification information of the another beam report.

In some embodiments, that the configuration information includes first reference signal resource configuration information associated with the beam report and second reference signal resource configuration information associated with the another beam report is:
the configuration information includes first reference signal resource setting information and second reference signal resource setting information.

In some embodiments, that reference signal resource configuration information associated with the configuration information includes second reference signal resource configuration information associated with the first reference signal resource is:
the first reference signal resource configuration information includes second reference signal resource setting information.

In some embodiments, the index is an antenna panel index or a transmission and reception point index; and
the identifier is an antenna panel identifier or a transmission and reception point identifier.

In some embodiments, beam reports transmitted on uplink channel resources having an association relationship are associated.

In some embodiments, the association relationship between the uplink channel resources is established by using at least one of the following pieces of first information in the configuration information:
a resource identifier of an uplink channel resource;
a period value of an uplink channel resource;
an offset value of an uplink channel resource;

a resource location of an uplink channel resource;
spatial relation information of an uplink channel resource;
a format of an uplink channel resource; and
scrambling code of an uplink channel resource.

In some embodiments, when same first information of at least two uplink channel resources uses different values, beam reports carried by the at least two uplink channel resources are associated; or
when same first information of at least two uplink channel resources uses a same value, beam reports carried by the at least two uplink channel resources are associated.

In some embodiments, the method further includes:
receiving a reference signal resource sent by the network side device based on the configuration information, and measuring the reference signal resource; and
the reporting a beam report to the network side device based on the configuration information includes:
sending a beam report based on a measurement result obtained by measuring the reference signal resource.

In some embodiments, the reference signal resource is periodic; or
the reference signal resource is semi-persistent; or
the reference signal resource is aperiodic.

In some embodiments, the reference signal resource is periodic or semi-persistent,
in a case that a period value of the reference signal resource is greater than or equal to a switching duration of an antenna panel of the terminal, the terminal uses at least one currently activated antenna panel to measure the reference signal resource; or at least one other antenna panel is enabled or activated to measure the reference signal resource, and the other antenna panel is currently inactive antenna panel; and
in a case that a period value of the reference signal resource is less than a switching duration of an antenna panel of the terminal, the terminal uses at least one currently activated antenna panel to measure the reference signal resource.

In some embodiments, the reference signal resource is aperiodic,
in a case that a trigger offset value obtained when the network side device triggers the reference signal resource is greater than or equal to a switching duration of an antenna panel of the terminal, the terminal uses at least one currently activated antenna panel to measure the reference signal resource; or at least one other antenna panel is enabled or activated to measure the reference signal resource, and the other antenna panel is currently inactive antenna panel; and
in a case that a trigger offset value obtained when the network side device triggers the reference signal resource is less than a switching duration of an antenna panel of the terminal, the terminal uses at least one currently activated antenna panel to measure the reference signal resource.

In some embodiments, the configuration information includes an index or identification information of an antenna panel of the terminal corresponding to the beam report, or fourth reference signal resource configuration information associated with the beam report includes an index or identification information of an antenna panel of the terminal.

In some embodiments, in a case that configuration information of at least two beam reports includes an index or identification information of a same antenna panel, the at least two beam reports have an association relationship, or in a case that the configuration information of at least two beam reports does not include an index or identification information of a same antenna panel, the at least two beam reports have no association relationship; or
in a case that fourth reference signal resource configuration information associated with at least two beam reports includes an index or identification information of a same antenna panel, the at least two beam reports have an association relationship, or in a case that the fourth reference signal resource configuration information associated with at least two beam reports does not include an index or identification information of a same antenna panel, the at least two beam reports have no association relationship.

In some embodiments, beam reports having an association relationship are corresponding to a same antenna panel of the terminal; and
beam reports having no association relationship are corresponding to different antenna panels of the terminal.

In some embodiments, the beam report is reported after the terminal measures a reference signal resource by using one antenna panel.

In some embodiments, the antenna panel is an active antenna panel and/or an inactive antenna panel.

In some embodiments, in at least two beam reports reported by the terminal, indexes of third reference signal resources corresponding to a reference signal resource indicator are the same,
in a case that the at least two beam reports are associated beam reports, the terminal determines beam information of a first type channel or reference signal and beam information of a second type channel or reference signal based on any beam information used for measuring the third reference signal resource; or determines beam information of a first type channel or reference signal and beam information of a second type channel or reference signal based on beam information used for measuring the third reference signal resource associated with a first beam report, where the first beam includes a latest beam report in the at least two beam reports; or determines beam information of a first type channel or reference signal based on beam information that is used when a measurement value is lower than a first threshold in measuring the third reference signal resource, and determines beam information of a second type channel or reference signal based on beam information that is used when a measurement value is higher than a second threshold; or
in a case that the at least two beam reports are unassociated beam reports, the terminal determines beam information of a first type channel or reference signal and beam information of a second type channel or reference signal based on beam information that is on at least one currently activated antenna panel and that is used for measuring the third reference signal resource, or determines beam information of a first type channel or reference signal and beam information of a second type channel or reference signal based on beam information that is on at least one other enabled or activated antenna panel and that is used for measuring the third reference signal resource, where the other antenna panel is currently inactive antenna panel.

In some embodiments, the first type channel or reference signal is a control channel and includes at least one of a physical downlink control channel (PDCCH) and a physical uplink control channel (PUCCH); and the second type channel or reference signal is a traffic channel and includes at least one of a physical downlink shared channel (PDSCH) and a physical uplink shared channel (PUSCH).

In some embodiments, the measurement value includes a layer 1-reference signal received power (L1-RSRP) and/or a layer 1-signal to interference plus noise ratio (L1-SINR).

In some embodiments, the first threshold is specified by a protocol or configured by a network side device; and the second threshold is specified by a protocol or configured by a network side device.

In some embodiments, the reference signal resource indicator includes a channel state information reference signal resource indicator and/or a synchronization signal block resource indicator.

According to a second aspect of this application, a method for receiving a beam report, applied to a network side device is provided, which includes:
  sending configuration information of a beam report to a terminal; and
  receiving a beam report of the terminal, where each of the beam reports is corresponding to one antenna panel of the terminal.

In some embodiments, a reportQuantity in the configuration information is set to any of the following: cri-RSRP, ssb-Index-RSRP, csi-SINR, and ssb-Index-SINR.

In some embodiments, the configuration information includes association information of at least two beam reports.

In some embodiments, the configuration information satisfies at least one of the following:
  the configuration information includes information about the beam report and information about another beam report associated with the beam report;
  the configuration information includes first reference signal resource configuration information associated with the beam report and second reference signal resource configuration information associated with the another beam report;
  reference signal resource configuration information associated with the configuration information includes second reference signal resource configuration information associated with the first reference signal resource;
  the configuration information includes uplink channel resources having an association relationship, and the uplink channel resources are used for transmitting the beam report and the another beam report; and
  in the configuration information, at least two beam reports corresponding to a same index or identifier are associated, or at least two beam reports corresponding to different indexes or identifiers are associated.

In some embodiments, that the configuration information includes information about the beam report and information about another beam report associated with the beam report is:
  the configuration information includes report configuration identification information of the another beam report.

In some embodiments, that the configuration information includes first reference signal resource configuration information associated with the beam report and second reference signal resource configuration information associated with the another beam report is:
  the configuration information includes first reference signal resource setting information and second reference signal resource setting information that have an association relationship.

In some embodiments, that reference signal resource configuration information associated with the configuration information includes second reference signal resource configuration information associated with the first reference signal resource is:
  the first reference signal resource configuration information includes second reference signal resource setting information.

In some embodiments, the index is an antenna panel index or a transmission and reception point index; and
  the identifier is an antenna panel identifier or a transmission and reception point identifier.

In some embodiments, the method further includes:
  sending a reference signal resource for measurement to the terminal based on the configuration information.

In some embodiments, the reference signal resource is periodic; or
  the reference signal resource is semi-persistent; or
  the reference signal resource is aperiodic.

In some embodiments, the configuration information includes an index or identification information of an antenna panel of the terminal corresponding to the beam report, or fourth reference signal resource configuration information associated with the beam report includes an index or identification information of an antenna panel of the terminal.

In some embodiments, in a case that configuration information of at least two beam reports includes an index or identification information of a same antenna panel, the at least two beam reports have an association relationship, or in a case that the configuration information of at least two beam reports does not include an index or identification information of a same antenna panel, the at least two beam reports have no association relationship; or
  in a case that fourth reference signal resource configuration information associated with at least two beam reports includes an index or identification information of a same antenna panel, the at least two beam reports have an association relationship, or in a case that the fourth reference signal resource configuration information associated with at least two beam reports does not include an index or identification information of a same antenna panel, the at least two beam reports have no association relationship.

In some embodiments, beam reports having an association relationship are corresponding to a same antenna panel of the terminal; and
  beam reports having no association relationship are corresponding to different antenna panels of the terminal.

In some embodiments, for associated at least two beam reports, the sending a reference signal resource to the terminal includes:
  sending a reference signal resource associated with some of beam reports by using a first type beam, and sending a reference signal resource associated with another beam report by using a second type beam.

In some embodiments, the first type beam is a wide beam, and the second type beam is a narrow beam.

In some embodiments, a source reference signal in transmission configuration indication information of a channel or reference signal to be scheduled, or a source reference signal in spatial relation information, or a source reference signal in quasi-co-location information is determined based on a reference signal resource corresponding to a reference signal resource indicator in the beam report.

In some embodiments, the reference signal resource indicator includes a channel state information reference signal resource indicator and/or a synchronization signal block resource indicator.

In some embodiments, a source reference signal in transmission configuration indication information of a first type channel or a reference signal, or a source reference signal in spatial relation information, or a source reference signal in quasi-co-location information is determined based on the reference signal resource that is sent by using the first type beam; and a source reference signal in transmission configuration indication information of a second type channel or a reference signal, or a source reference signal in spatial relation information, or a source reference signal in quasi-co-location information is determined based on the reference signal resource that is sent by using the second type beam.

In some embodiments, in at least two received beam reports of the terminal, indexes of third reference signal resources corresponding to a reference signal resource indicator are the same, in a case that the at least two beam reports are associated beam reports, beam information of a first type channel or reference signal and beam information of a second type channel or reference signal are determined based on any beam information used for sending the third reference signal resource; or beam information of a first type channel or reference signal and beam information of a second type channel or reference signal are determined based on beam information used for sending the third reference signal resource associated with a first beam report, where the first beam includes a latest beam report in the at least two beam reports; or beam information of a first type channel or reference signal is determined based on first type beam information that is used to send the third reference signal resource, and beam information of a second type channel or reference signal is determined based on second type beam information that is used to send the third reference signal resource; or in a case that the at least two beam reports are unassociated beam reports, beam information of a first type channel or reference signal and beam information of a second type channel or reference signal are determined based on beam information used for sending the third reference signal resource to the terminal for measurement by using a designated antenna panel, where the designated antenna panel is at least one currently activated antenna panel of the terminal or at least one other enabled or activated antenna panel of the terminal, and the other antenna panel is currently inactive antenna panel.

In some embodiments, the first type channel or reference signal is a control channel and includes at least one of a physical downlink control channel (PDCCH) and a physical uplink control channel (PUCCH); and the second type channel or reference signal is a traffic channel and includes at least one of a physical downlink shared channel (PDSCH) and a physical uplink shared channel (PUSCH).

According to a third aspect of this application, an apparatus for sending a beam report, applied to a terminal is provided, which includes:

a receiving module, configured to receive configuration information of a beam report sent by a network side device; and a reporting module, configured to report a beam report to the network side device based on the configuration information, where each of the beam reports is corresponding to one antenna panel of the terminal.

In some embodiments, a reportQuantity in the configuration information is set to any of the following: cri-RSRP, ssb-Index-RSRP, csi-SINR, and ssb-Index-SINR.

In some embodiments, each of the beam reports is a beam report in each beam report instance.

In some embodiments, the configuration information includes association information of at least two beam reports.

In some embodiments, the configuration information satisfies at least one of the following:

the configuration information includes information about the beam report and information about another beam report associated with the beam report;

the configuration information includes first reference signal resource configuration information associated with the beam report and second reference signal resource configuration information associated with the another beam report;

reference signal resource configuration information associated with the configuration information includes second reference signal resource configuration information associated with the first reference signal resource;

the configuration information includes uplink channel resources having an association relationship, and the uplink channel resources are used for transmitting the beam report and the another beam report; and in the configuration information, at least two beam reports corresponding to a same index or identifier are associated, or at least two beam reports corresponding to different indexes or identifiers are associated.

In some embodiments, that the configuration information includes information about the beam report and information about another beam report associated with the beam report is:

the configuration information includes report configuration identification information of the another beam report.

In some embodiments, that the configuration information includes first reference signal resource configuration information associated with the beam report and second reference signal resource configuration information associated with the another beam report is:

the configuration information includes first reference signal resource setting information and second reference signal resource setting information.

In some embodiments, that reference signal resource configuration information associated with the configuration information includes second reference signal resource configuration information associated with the first reference signal resource is:

the first reference signal resource configuration information includes second reference signal resource setting information.

In some embodiments, the index is an antenna panel index or a transmission and reception point index; and the identifier is an antenna panel identifier or a transmission and reception point identifier.

In some embodiments, beam reports transmitted on uplink channel resources having an association relationship are associated.

In some embodiments, the association relationship between the uplink channel resources is established by using at least one of the following pieces of first information in the configuration information:
  a resource identifier of an uplink channel resource;
  a period value of an uplink channel resource;
  an offset value of an uplink channel resource;
  a resource location of an uplink channel resource;
  spatial relation information of an uplink channel resource;
  a format of an uplink channel resource; and
  scrambling code of an uplink channel resource.

In some embodiments, when same first information of at least two uplink channel resources uses different values, beam reports carried by the at least two uplink channel resources are associated; or
  when same first information of at least two uplink channel resources uses a same value, beam reports carried by the at least two uplink channel resources are associated.

In some embodiments, the receiving module is further configured to: receive a reference signal resource sent by the network side device based on the configuration information, and measure the reference signal resource; and
  the reporting module is further configured to send a beam report based on a measurement result obtained by measuring the reference signal resource.

In some embodiments, the reference signal resource is periodic; or
  the reference signal resource is semi-persistent; or
  the reference signal resource is aperiodic.

In some embodiments, the reference signal resource is periodic or semi-persistent, in a case that a period value of the reference signal resource is greater than or equal to a switching duration of an antenna panel of the terminal, the terminal uses at least one currently activated antenna panel to measure the reference signal resource; or at least one other antenna panel is enabled or activated to measure the reference signal resource, and the other antenna panel is currently inactive antenna panel; and
  in a case that a period value of the reference signal resource is less than a switching duration of an antenna panel of the terminal, the terminal uses at least one currently activated antenna panel to measure the reference signal resource.

In some embodiments, the reference signal resource is aperiodic,
  in a case that a trigger offset value obtained when the network side device triggers the reference signal resource is greater than or equal to a switching duration of an antenna panel of the terminal, the terminal uses at least one currently activated antenna panel to measure the reference signal resource; or at least one other antenna panel is enabled or activated to measure the reference signal resource, and the other antenna panel is currently inactive antenna panel; and
  in a case that a trigger offset value obtained when the network side device triggers the reference signal resource is less than a switching duration of an antenna panel of the terminal, the terminal uses at least one currently activated antenna panel to measure the reference signal resource.

In some embodiments, the configuration information includes an index or identification information of an antenna panel of the terminal corresponding to the beam report, or fourth reference signal resource configuration information associated with the beam report includes an index or identification information of an antenna panel of the terminal.

In some embodiments, in a case that configuration information of at least two beam reports includes an index or identification information of a same antenna panel, the at least two beam reports have an association relationship, or in a case that the configuration information of at least two beam reports does not include an index or identification information of a same antenna panel, the at least two beam reports have no association relationship; or
  in a case that fourth reference signal resource configuration information associated with at least two beam reports includes an index or identification information of a same antenna panel, the at least two beam reports have an association relationship, or in a case that the fourth reference signal resource configuration information associated with at least two beam reports does not include an index or identification information of a same antenna panel, the at least two beam reports have no association relationship.

In some embodiments, beam reports having an association relationship are corresponding to a same antenna panel of the terminal; and
  beam reports having no association relationship are corresponding to different antenna panels of the terminal.

In some embodiments, the beam report is reported after the terminal measures a reference signal resource by using one antenna panel.

In some embodiments, the antenna panel is an active antenna panel and/or an inactive antenna panel.

In some embodiments, in at least two beam reports reported by the terminal, indexes of third reference signal resources corresponding to a reference signal resource indicator are the same,
  in a case that the at least two beam reports are associated beam reports, the terminal determines beam information of a first type channel or reference signal and beam information of a second type channel or reference signal based on any beam information used for measuring the third reference signal resource; or determines beam information of a first type channel or reference signal and beam information of a second type channel or reference signal based on beam information used for measuring the third reference signal resource associated with a first beam report, where the first beam includes a latest beam report in the at least two beam reports; or determines beam information of a first type channel or reference signal based on beam information that is used when a measurement value is lower than a first threshold in measuring the third reference signal resource, and determines beam information of a second type channel or reference signal based on beam information that is used when a measurement value is higher than a second threshold; or
  in a case that the at least two beam reports are unassociated beam reports, the terminal determines beam information of a first type channel or reference signal and beam information of a second type channel or reference signal based on beam information that is on at least one currently activated antenna panel and that is used for measuring the third reference signal resource, or determines beam information of a first type channel or reference signal and beam information of a second type channel or reference signal based on beam information that is on at least one other enabled or activated antenna panel and that is used for measuring the third reference signal resource, where the other antenna panel is currently inactive antenna panel.

In some embodiments, the first type channel or reference signal is a control channel and includes at least one of a physical downlink control channel (PDCCH) and a physical uplink control channel (PUCCH); and the second type channel or reference signal is a traffic channel and includes at least one of a physical downlink shared channel (PDSCH) and a physical uplink shared channel (PUSCH).

In some embodiments, the measurement value includes a layer 1-reference signal received power (L1-RSRP) and/or a layer 1-signal to interference plus noise ratio (L1-SINR).

In some embodiments, the first threshold is specified by a protocol or configured by a network side device; and the second threshold is specified by a protocol or configured by a network side device.

In some embodiments, the reference signal resource indicator includes a channel state information reference signal resource indicator and/or a synchronization signal block resource indicator.

According to a fourth aspect of this application, an apparatus for receiving a beam report, applied to a network side device is provided, which includes:

a sending module, configured to send configuration information of a beam report to a terminal; and a beam report receiving module, configured to receive a beam report of the terminal, where each of the beam reports is corresponding to one antenna panel of the terminal.

In some embodiments, a reportQuantity in the configuration information is set to any of the following: cri-RSRP, ssb-Index-RSRP, csi-SINR, and ssb-Index-SINR.

In some embodiments, the configuration information includes association information of at least two beam reports.

In some embodiments, the configuration information satisfies at least one of the following:

the configuration information includes information about the beam report and information about another beam report associated with the beam report;

the configuration information includes first reference signal resource configuration information associated with the beam report and second reference signal resource configuration information associated with the another beam report;

reference signal resource configuration information associated with the configuration information includes second reference signal resource configuration information associated with the first reference signal resource;

the configuration information includes uplink channel resources having an association relationship, and the uplink channel resources are used for transmitting the beam report and the another beam report; and in the configuration information, at least two beam reports corresponding to a same index or identifier are associated, or at least two beam reports corresponding to different indexes or identifiers are associated.

In some embodiments, that the configuration information includes information about the beam report and information about another beam report associated with the beam report is:

the configuration information includes report configuration identification information of the another beam report.

In some embodiments, that the configuration information includes first reference signal resource configuration information associated with the beam report and second reference signal resource configuration information associated with the another beam report is:

the configuration information includes first reference signal resource setting information and second reference signal resource setting information that have an association relationship.

In some embodiments, that reference signal resource configuration information associated with the configuration information includes second reference signal resource configuration information associated with the first reference signal resource is:

the first reference signal resource configuration information includes second reference signal resource setting information.

In some embodiments, the index is an antenna panel index or a transmission and reception point index; and the identifier is an antenna panel identifier or a transmission and reception point identifier.

In some embodiments, the sending module is further configured to send a reference signal resource for measurement to the terminal based on the configuration information.

In some embodiments, the reference signal resource is periodic; or the reference signal resource is semi-persistent; or the reference signal resource is aperiodic.

In some embodiments, the configuration information includes an index or identification information of an antenna panel of the terminal corresponding to the beam report, or fourth reference signal resource configuration information associated with the beam report includes an index or identification information of an antenna panel of the terminal.

In some embodiments, in a case that configuration information of at least two beam reports includes an index or identification information of a same antenna panel, the at least two beam reports have an association relationship, or in a case that the configuration information of at least two beam reports does not include an index or identification information of a same antenna panel, the at least two beam reports have no association relationship; or in a case that fourth reference signal resource configuration information associated with at least two beam reports includes an index or identification information of a same antenna panel, the at least two beam reports have an association relationship, or in a case that the fourth reference signal resource configuration information associated with at least two beam reports does not include an index or identification information of a same antenna panel, the at least two beam reports have no association relationship.

In some embodiments, beam reports having an association relationship are corresponding to a same antenna panel of the terminal; and beam reports having no association relationship are corresponding to different antenna panels of the terminal.

In some embodiments, the sending module is further configured to send a reference signal resource associated with some of beam reports by using a first type beam, and sending a reference signal resource associated with another beam report by using a second type beam.

In some embodiments, the first type beam is a wide beam, and the second type beam is a narrow beam.

In some embodiments, the apparatus further includes:

a determining module, configured to determine a source reference signal in transmission configuration indication information of a channel or reference signal to be scheduled, or a source reference signal in spatial relation information, or a source reference signal in quasi-co-location information is determined based on a reference signal resource corresponding to a reference signal resource indicator in the beam report.

In some embodiments, the reference signal resource indicator includes a channel state information reference signal resource indicator and/or a synchronization signal block resource indicator.

In some embodiments, the determining module is further configured to determine a source reference signal in transmission configuration indication information of a first type channel or a reference signal, or a source reference signal in spatial relation information, or a source reference signal in quasi-co-location information based on the reference signal resource that is sent by using the first type beam; and a source reference signal in transmission configuration indication information of a second type channel or a reference signal, or a source reference signal in spatial relation information, or a source reference signal in quasi-co-location information is determined based on the reference signal resource that is sent by using the second type beam.

In some embodiments, in at least two received beam reports of the terminal, indexes of third reference signal resources corresponding to a reference signal resource indicator are the same, and the apparatus further includes:

a determining module, configured to: in a case that the at least two beam reports are associated beam reports, determine beam information of a first type channel or reference signal and beam information of a second type channel or reference signal based on any beam information used for sending the third reference signal resource; or determine beam information of a first type channel or reference signal and beam information of a second type channel or reference signal based on beam information used for sending the third reference signal resource associated with a first beam report, where the first beam includes a latest beam report in the at least two beam reports; or determine beam information of a first type channel or reference signal based on first type beam information that is used to send the third reference signal resource, and determine beam information of a second type channel or reference signal based on second type beam information that is used to send the third reference signal resource; or in a case that the at least two beam reports are unassociated beam reports, determine beam information of a first type channel or reference signal and beam information of a second type channel or reference signal based on beam information used for sending the third reference signal resource to the terminal for measurement by using a designated antenna panel, where the designated antenna panel is at least one currently activated antenna panel of the terminal or at least one other enabled or activated antenna panel of the terminal, and the other antenna panel is currently inactive antenna panel.

In some embodiments, the first type channel or reference signal is a control channel and includes at least one of a physical downlink control channel (PDCCH) and a physical uplink control channel (PUCCH); and the second type channel or reference signal is a traffic channel and includes at least one of a physical downlink shared channel (PDSCH) and a physical uplink shared channel (PUSCH).

According to a fifth aspect of this application, an electronic device is provided, which includes a processor, a memory, and a program or an instruction stored in the memory and executable on the processor. When the program or the instruction is executed by the processor, steps of the foregoing method are implemented.

According to a sixth aspect of this application, a readable storage medium is provided, where the readable storage medium stores a program or an instruction, and the program or the instruction is executed by a processor to implement steps of the foregoing method.

According to a seventh aspect of this application, a chip is provided, where the chip includes a processor and a communications interface, the communications interface is coupled to the processor, and the processor is configured to run a program or an instruction, to implement the method according to the first aspect.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may derive other drawings from these accompanying drawings without creative efforts.

DESCRIPTION OF EMBODIMENTS

Figure 1:
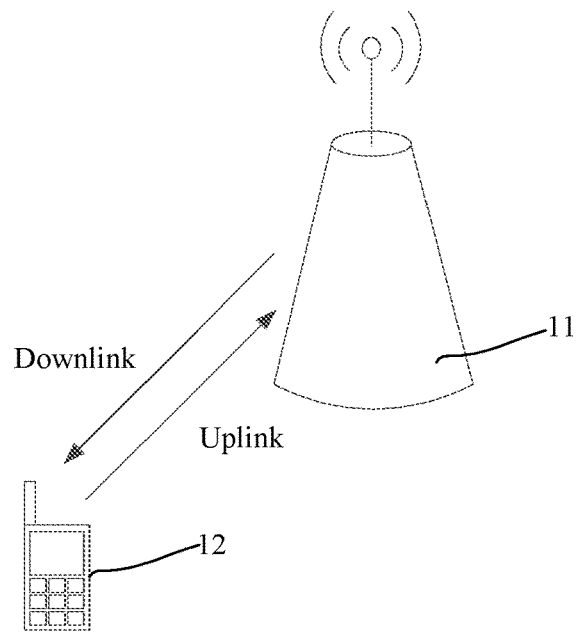
FIG. 1 is a schematic diagram of a wireless communications system.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects instead of describing a specific order or sequence. It should be understood that the data used in such a way is interchangeable in proper circumstances so that the embodiments of this application can be implemented in an order other than the order illustrated or described herein. In addition, in the specification and the claims, "and/or" represents at least one of connected objects, and a character "/" generally represents an "or" relationship between associated objects.

The technology described in this specification is not limited to a Long Term Evolution (LTE)/LTE-Advanced (LTE-A) system, and may also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" are often interchangeably used. A CDMA system may implement a radio technology such as CDMA2000 or universal terrestrial radio access (UTRA). UTRA includes wideband CDMA (WCDMA) and other CDMA variants. The TDMA system can implement a radio technology such as Global System for Mobile Communication (GSM). The OFDMA system can implement radio technologies such as ultra mobile broadband (UMB), evolved-UTRA (E-UTRA), IEEE 802.11 (Wi-Fi), IEEE 802.16 (WiMAX), IEEE 802.20, Flash-OFDM, and the like. UTRA and E-UTRA are parts of the Universal Mobile Telecommunications System (UMTS). LTE and more advanced LTE (for example, LTE-A) are new UMTS versions using E-UTRA. The UTRA, E-UTRA, UMTS, LTE, LTE-A and GSM are described in documents from an organization named "3rd generation partnership project" (3rd Generation Partnership Project, 3GPP)". CDMA2000 and UMB are described in a document from an origination named "3rd Generation Partnership Project 2" (3GPP2). The technologies described in this specification may be used in the systems and radio technologies mentioned above, and may also be used in another system and radio technology. However, an NR system is described in the following description for illustrative purposes, and an NR terminology is used in most of the following description, although these technologies can also be applied to applications other than the NR system application.

The following description provides examples without limiting the scope, applicability, or configuration set forth in the claims. The functions and arrangements of the elements under discussion may be changed without departing from the spirit and scope of the present disclosure. In the examples, various procedures or components may be appropriately omitted, replaced, or added. For example, the described method may be performed in an order different from that described, and steps may be added, omitted, or combined. In addition, features described with reference to some examples may be combined in other examples.

Referring to FIG. 1, FIG. 1 is a block diagram of a wireless communications system to which embodiments of this application can be applied. The wireless communications system includes a terminal 11 and a network side device 12. The terminal 11 may be alternatively referred to as a terminal device or user equipment (UE). The terminal 11 may be a terminal side device such as a mobile phone, a tablet personal computer, a laptop computer, a personal digital assistant (PDA), a mobile Internet device (MID), a wearable device, or an in-vehicle device. It should be noted that a specific type of the terminal 11 is not limited in this embodiment of this application. The network side device 12 may be a base station or a core network. The base station may be a base station of 5G or a later version (for example, gNB or 5G NR NB), or a base station in another communications system (for example, an eNB, a WLAN access point, or another access point), or a location server (for example, an E-SMLC or an LMF (Location Manager Function)). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specified technical term. It should be noted that, in the embodiments of this application, only a base station in an NR system is used as an example, but a specific type of the base station and a specific communications system are not limited in the embodiments of this application.

Radio access technology standards such as Long Term Evolution (LTE)/LTE-Advanced (LTE-A) are all constructed based on multiple-input multiple-output (MIMO)+ orthogonal frequency division multiplexing (OFDM) technologies. The MIMO technology improves a peak rate and system spectrum utilization by using a spatial degree of freedom available in a multiple-antenna system.

The dimension of the MIMO technology is constantly expanding, and in some communication protocols, a maximum of 4 layers of MIMO transmission can be supported. In the enhanced MU-MIMO technology, a maximum of 4 downlink data layers can be supported in Multi-User MIMO (MU-MIMO) transmission of a transmission mode (TM)-8. In some communication protocols, a transmission capability of single-user MIMO (SU-MIMO) may be expanded to a maximum of 8 data layers.

The MIMO technology is pushed towards a three-dimensional and large-scale direction. Massive MIMO technology uses a large-scale antenna array, which can greatly improve system frequency band utilization efficiency and support more access users. Therefore, the massive MIMO technology is one of most promising physical layer technologies in a next-generation mobile communications system.

In the massive MIMO technology, if a full digital array is used, a maximized spatial resolution and an optimal MU-MIMO performance can be implemented, but this structure requires a large number of analog-digital/digital-analog (AD/DA) conversion devices and a large number of complete radio frequency-baseband processing channels, causing a huge burden on both device cost and baseband processing complexity.

To avoid the foregoing implementation costs and device complexity, a digital-analog hybrid beamforming technology emerges, that is, based on traditional digital domain beamforming, a stage of beamforming is added to a radio frequency signal near a front end of an antenna system. The analog beamforming can achieve a rough match between a transmitted signal and a channel in a relatively simple way. Dimension of an equivalent channel formed by the analog beamforming is smaller than an actual quantity of antennas, so subsequent required AD/DA conversion devices, the quantity of digital channels, and the corresponding baseband processing complexity can be greatly reduced. Partial residual interference in analog forming may be processed again in a digital domain to ensure quality of MU-MIMO transmission. Compared with all-digital beamforming, digital-analog hybrid beamforming is a solution that balances performance and complexity, and has bright practical prospect in a high-band system with large bandwidth or a system with a very large number of antennas.

In research of a next-generation communications system after 4G, an operating frequency band supported by the system is increased to above 6 GHz, up to about 100 GHz.

A high frequency band has relatively abundant idle frequency resources, and can provide greater throughput for data transmission. A high frequency signal has a shorter wavelength. Compared with a low frequency band, more antenna array elements can be arranged on a same-size antenna panel, and a beamforming technology can be used to form a beam having higher directivity and narrower lobes. Therefore, it also is one of the future trends to combine large-scale antennas with high frequency communication.

The analog beamforming is of full-bandwidth transmission, and each polarization direction array element on an antenna panel of each high-frequency antenna array can transmit an analog beam only in a time-division multiplexing mode. A weight of the analog beamforming is implemented by adjusting parameters of devices such as a radio frequency front-end phase shifter.

Currently, a polling method is usually used to train analog beamforming vectors. To be specific, array elements of each antenna panel in each polarization direction sequentially send a training signal (that is, a candidate beamforming vector) at an appointed time in a time division multiplexing mode, and a terminal feeds back a beam report after measurement, so that a network side can use the training signal to implement simulated beam transmission during a next service transmission. Content of a beam report usually includes identifiers of several optimal transmit beams and a corresponding received power or signal-to-interference-plus-noise ratio.

During beam measurement, the network may configure an RS resource set, which includes at least one reference signal resource, such as an SSB resource or a CSI-RS resource. The UE measures the L1-RSRP/L1-SINR of each RS resource, and reports at least one optimal measurement result to the network. Reported content includes the SSBRI or the CRI and the corresponding L1-RSRP/L1-SINR. The report content reflects at least one optimal beam and quality thereof, which can be used by the network to determine beam information that is used to transmit channels or signals with the UE.

After beam measurement and beam reporting, the network may perform beam indication for downlink and uplink channels or reference signals, which is used to establish a beam link between the network and the UE, thus realizing transmission of channels or reference signals.

As for beam indication for a PDCCH, the network uses radio resource control (RRC) signaling to configure K transmission configuration indication (TCI) states for each CORESET. When K>1, a Medium Access Control-Control Element (MAC CE) indicates or activates one TCI state, and when K=1, no additional MAC CE command is needed. When the UE monitors the PDCCH, same quasi-co-location (QCL) information is used for all search space in the CORESET, that is, a same TCI state is used to monitor the PDCCH. A source reference signal (reference signal) (for example, a periodic CSI-RS resource, a semi-persistent CSI-RS resource, an SS block, and the like) in the TCI state is spatially quasi-co-located with a UE-specific PDCCH demodulation reference signal (DMRS) port. The UE may learn, based on the TCI state, which receiving beam to use to receive the PDCCH.

As for the beam indication for the PDSCH, the network configures M TCI states by using RRC signaling, then activates $2^N$ TCI states by using a MAC CE command, and then informs the TCI state by using an N-bit TCI field of downlink control information (DCI). The reference signal in the TCI state is quasi-co-located with the DMRS port of the PDSCH to be scheduled. The UE may learn, based on the TCI state, which receiving beam to use to receive the PDSCH.

For the beam indication of the CSI-RS, when the CSI-RS is a periodic CSI-RS, the network configures QCL information for the CSI-RS resource through RRC signaling. When the CSI-RS is a semi-persistent CSI-RS, the network indicates QCL information thereof when activating, through the MAC CE command, a CSI-RS resource from a CSI-RS resource set configured by the RRC. When the CSI-RS is an aperiodic CSI-RS, the network configures the QCL for the CSI-RS resource through RRC signaling, and uses the DCI to trigger the CSI-RS.

As for beam indication for a physical uplink control channel (PUCCH), the network uses RRC signaling to configure spatial relation information for each PUCCH resource through a parameter, namely, PUCCH-SpatialRelationInfo. When there are a plurality pieces of spatial relation information configured for the PUCCH resource, the MAC CE is used to activate one of the pieces of spatial relation information. When there is only one piece of spatial relation information configured for the PUCCH resource, no additional MAC CE command is required.

As for beam indication for a physical uplink shared channel (PUSCH), when the DCI carried on the PDCCH schedules the PUSCH, each SRI codepoint in a sounding reference signal resource indicator (SRS resource indicator, SRI) field in the DCI indicates an SRI, and the SRI is used to indicate the spatial relation information of the PUSCH.

As for beam indication for a sounding reference signal (SRS), when the SRS is a periodic SRS, the network configures spatial relation information for the SRS resource through RRC signaling. When the SRS is a semi-persistent SRS, the network activates, through a MAC CE command, one of a group of spatial relation information configured by the RRC. When the SRS is an aperiodic SRS, the network configures spatial relation information for the SRS resource through RRC signaling, and may also update the spatial relation information of the aperiodic SRS resource by using a MAC CE command.

In a multi-TRP scenario, based on a sending mode of control information, it can be divided into single DCI and multi-DCI. The single DCI refers to sending DCI at one transmission and reception point (TRP) to schedule data transmission on a plurality of TRPs, while the multi-DCI refers to allowing DCI to be sent at a plurality of TRPs to schedule data transmission on TRPs respectively.

When DCI is used to schedule a PDSCH, if a scheduling offset (scheduling offset or referred to as time offset) between the DCI and the PDSCH is less than or equal to a preset threshold, it is necessary to use a default beam to transmit the PDSCH.

Generally, a control channel (such as a physical downlink control channel (PDCCH)) has a wider beam to ensure coverage, while a traffic channel (such as a physical downlink shared channel (PDSCH)) has a narrower beam to improve a receiving signal-to-noise ratio and obtain better data rate and throughput. However, when the network uses the RS resource (RS resource) for the UE to measure the beam quality, and when the UE only uses the layer 1-reference signal received power (L1-RSRP) obtained by measuring the RS resource or the layer 1-signal to interference plus noise ratio (L1-SINR) to select the beam with better quality, probably because the beam quality of the wide beam is not as good as that of the narrow beam, the RS resource sent by the network by using the wide beam in the beam measurement process will not be reported by the UE in the beam report, and it is not easy for the network to learn, based on the SSBRI and/or CRI in the beam report, which beams will be used to transmit the control channel, that is, wide beam information that is expected to be used to transmit the control channel cannot be learned.

The beam information mentioned above may also be referred to as beam information, spatial relation information, spatial domain transmission filter information, spatial filter information, transmission configuration indication state (TCI state) information, quasi-co-location (QCL) information, a QCL parameter, or the like. The downlink beam information may usually be represented by the TCI state information or the QCL information. The uplink beam information may usually be represented by the spatial relation information.

The mentioned antenna panel may also be referred to as: an antenna group, an antenna port group, an antenna set, an antenna port set, a beam set, a beam subset, an antenna array, an antenna port array, an antenna sub-array, an antenna port sub-array, a logical entity, an entity, an antenna entity, or the like.

The beam report, namely, the parameter reportQuantity in channel state information (CSI) report configuration information is set to cri-RSRP, ssb-Index-RSRP, csi-SINR, and ssb-Index-SINR. Alternatively, the beam report may also be referred to as the L1-RSRP report or the L1-SINR report.

Figure 2:
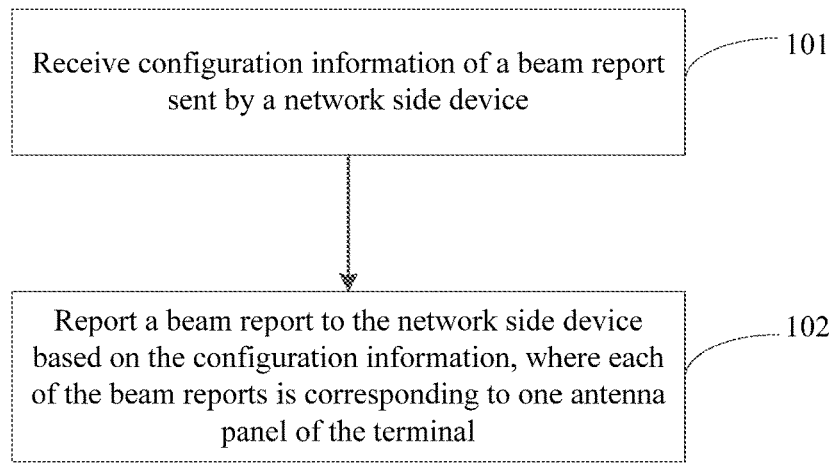
FIG. 2 is a schematic flowchart of a method for sending a beam report according to an embodiment of this application.

An embodiment of this application provides a method for sending a beam report, applied to a terminal. As shown in FIG. 2, the method includes the following steps.

Step 101: Receive configuration information of a beam report sent by a network side device.

Step 102: Report a beam report to the network side device based on the configuration information, where each of the beam reports is corresponding to one antenna panel of the terminal.

One antenna panel of the terminal corresponding to the beam report may be one antenna panel identifier (ID).

In the embodiments of this application, the terminal sends the beam report to the network side device based on the configuration information of the beam report of the network side device, and each beam report is corresponding to one antenna panel of the terminal. In this way, the network side device can learn the antenna panel of the terminal corresponding to reference signal resource indication information (such as SSBRI and CRI) in the beam report even if the index or identifier of the antenna panel is not carried in the beam report. Thus, signaling overhead can be saved, and the network can accurately learn the antenna panel of the terminal corresponding to the beam report, which facilitates scheduling data transmission.

In some embodiments, a parameter reportQuantity in the configuration information may be set to any of the following: cri-RSRP, ssb-Index-RSRP, csi-SINR, and ssb-Index-SINR.

In some embodiments, each of the beam reports is a beam report in each beam report instance.

In some embodiments, the configuration information may include association information of at least two beam reports.

For example, the configuration information satisfies at least one of the following:

the configuration information includes information about the beam report and information about another beam report associated with the beam report;

the configuration information includes first reference signal resource configuration information associated with the beam report and second reference signal resource configuration information associated with the another beam report;

reference signal resource configuration information associated with the configuration information includes second reference signal resource configuration information associated with the first reference signal resource;

the configuration information includes uplink channel resources having an association relationship, and the uplink channel resources are used for transmitting the beam report and the another beam report; and in the configuration information, at least two beam reports corresponding to a same index or identifier are associated, or at least two beam reports corresponding to different indexes or identifiers are associated.

The index may be an antenna panel index or a transmission and reception point index; and the identifier may be an antenna panel identifier or a transmission and reception point identifier.

In this embodiment, the association relationship between beam reports is established to enable the network side device to determine various types of optimal beams, so as to meet performance requirements of different channels.

In some embodiments, that the configuration information includes information about the beam report and information about another beam report associated with the beam report is:

the configuration information includes report configuration identification information of the another beam report. For example, if CSI-ReportConfig includes report configuration identification information, namely, reportConfigId=1 of the beam report and associated report configuration identification information, namely, reportConfigId=2 of the another beam report, then two beam reports corresponding to reportConfigId=1 and reportConfigId=2 have association relationship.

In some embodiments, that the configuration information includes first reference signal resource configuration information associated with the beam report and second reference signal resource configuration information associated with the another beam report is:

the configuration information includes first reference signal resource setting information and second reference signal resource setting information. For example, if CSI-ReportConfig includes the first reference signal resource setting information associated with the beam report, namely, CSI-ResourceConfigId=1, and the second reference signal resource setting information associated with the another beam report, namely, CSI-ResourceConfigId=2, then the beam report associated with CSI-ResourceConfigId=1 and the another beam report associated with CSI-ResourceConfigId=2 have association relationship.

In some embodiments, that reference signal resource configuration information associated with the configuration information includes second reference signal resource configuration information associated with the first reference signal resource is:

the first reference signal resource configuration information includes the second reference signal resource setting information, for example, in configuration information CSI-ResourceConfig of the first reference signal resource associated with the beam report (such as reportConfigId=1) included in CSI-ReportConfig, in addition to first reference signal resource setting information (such as CSI-ResourceConfigId=1), setting information (such as CSI-ResourceConfigId=2) of the second reference signal resource associated with the another beam report is also included.

In some embodiments, beam reports that are transmitted on uplink channel resources having association relationship are associated, and the association relationship between the uplink channel resources may be established by using at least one of the following pieces of first information in the configuration information:
- a resource identifier of an uplink channel resource;
- a period value of an uplink channel resource;
- an offset value of an uplink channel resource;
- a resource location of an uplink channel resource;
- spatial relation information of an uplink channel resource;
- a format of an uplink channel resource; and
- scrambling code of an uplink channel resource.

If the foregoing first information is used to realize association relationship between uplink resources, when same first information of at least two uplink channel resources uses different values, beam reports carried by the at least two uplink channel resources may be associated; or when same first information of at least two uplink channel resources uses a same value, beam reports carried by the at least two uplink channel resources may be associated.

In some embodiments, the method further includes:
- receiving a reference signal resource sent by the network side device based on the configuration information, and measuring the reference signal resource; and
- the reporting a beam report to the network side device based on the configuration information includes:
- sending a beam report based on a measurement result obtained by measuring the reference signal resource.

The reference signal resource is periodic; or
the reference signal resource is semi-persistent; or
the reference signal resource is aperiodic.

In some embodiments, the reference signal resource is periodic or semi-persistent,
- in a case that a period value of the reference signal resource is greater than or equal to a switching duration of an antenna panel of the terminal, the terminal uses at least one currently activated antenna panel to measure the reference signal resource; or at least one other antenna panel is enabled or activated to measure the reference signal resource, and the other antenna panel is currently inactive antenna panel; and
- in a case that a period value of the reference signal resource is less than a switching duration of an antenna panel of the terminal, the terminal uses at least one currently activated antenna panel to measure the reference signal resource.

In some embodiments, the reference signal resource is aperiodic,
- in a case that a trigger offset value obtained when the network side device triggers the reference signal resource is greater than or equal to a switching duration of an antenna panel of the terminal, the terminal uses at least one currently activated antenna panel to measure the reference signal resource; or at least one other antenna panel is enabled or activated to measure the reference signal resource, and the other antenna panel is currently inactive antenna panel; and
- in a case that a trigger offset value obtained when the network side device triggers the reference signal resource is less than a switching duration of an antenna panel of the terminal, the terminal uses at least one currently activated antenna panel to measure the reference signal resource.

In some embodiments, the configuration information includes an index or identification information of an antenna panel of the terminal corresponding to the beam report, or fourth reference signal resource configuration information associated with the beam report includes an index or identification information of an antenna panel of the terminal.

In some embodiments, in a case that configuration information of at least two beam reports includes an index or identification information of a same antenna panel, the at least two beam reports have an association relationship, or in a case that the configuration information of at least two beam reports does not include an index or identification information of a same antenna panel, the at least two beam reports have no association relationship; or
- in a case that fourth reference signal resource configuration information associated with at least two beam reports includes an index or identification information of a same antenna panel, the at least two beam reports have an association relationship, or in a case that the fourth reference signal resource configuration information associated with at least two beam reports does not include an index or identification information of a same antenna panel, the at least two beam reports have no association relationship.

Beam reports having an association relationship are corresponding to a same antenna panel of the terminal; and
beam reports having no association relationship are corresponding to different antenna panels of the terminal.

In this embodiment, the beam report that is sent by the terminal to the network side device is reported after the terminal measures a reference signal resource by using one antenna panel. The UE reports the associated beam reports after measuring them with a same panel, and the UE reports the unassociated beam reports after measuring them with different panels. The UE only reports beam report measured by using one panel in one report instance, and the panel may be a currently activated panel or a newly enabled or activated panel. That is, the antenna panel is an active antenna panel and/or an inactive antenna panel. The active antenna panel is the currently activated antenna panel used for data transmission, while the inactive antenna panel is the currently inactivated antenna panel not used for data transmission. The terminal may activate the inactive antenna panel for measurement, and disables the antenna panel not used for data transmission after determining the antenna panel used for data transmission. When the UE needs to switch antenna panels, the UE may decide which antenna panel to enable or activate based on network control or by itself.

In some embodiments, in at least two beam reports reported by the terminal, indexes of third reference signal resources corresponding to a reference signal resource indicator are the same,
- if the at least two beam reports are associated beam reports, the network may determine a source RS in TCI state information, QCL information, or spatial relation information of the first type channel or reference signal and the second type channel or reference signal based on the third reference signal resource. The terminal determines beam information of a first type channel or reference signal and beam information of a second type channel or reference signal based on any beam information used for measuring the third reference signal resource; or determines beam information of a first type channel or reference signal and beam information of a second type channel or reference signal based on beam information used for measuring the third reference signal resource associated with a first beam report, where the first beam includes a latest beam report in the at least two beam reports; or determines beam information of a first type channel or reference signal based on beam information that is used when a measurement value is lower than a first threshold in measuring the third reference signal resource, and determines beam information of a second type channel or reference signal based on beam information that is used when a measurement value is higher than a second threshold; or if the at least two beam reports are unassociated beam reports, it indicates that each original quantity of the third RS resource (RS resource) measured by the UE by using different panel is better, and the original quantity is reported to the network through unassociated beam reports. When the network determines the source RS in the TCI state information, the QCL information, or the spatial relation information of the first type channel or reference signal and the second type channel or reference signal based on the RS resource, the UE may still use the current panel for receiving, or may switch to another panel that measures and reports the RS resource for receiving. That is, the terminal determines beam information of a first type channel or reference signal and beam information of a second type channel or reference signal based on beam information that is on at least one currently activated antenna panel and that is used for measuring the third reference signal resource, or determines beam information of a first type channel or reference signal and beam information of a second type channel or reference signal based on beam information that is on at least one other enabled or activated antenna panel and that is used for measuring the third reference signal resource, where the other antenna panel is currently inactive antenna panel.

The first type channel or reference signal is a control channel and includes at least one of a physical downlink control channel (PDCCH) and a physical uplink control channel (PUCCH); and the second type channel or reference signal is a traffic channel and includes at least one of a physical downlink shared channel (PDSCH) and a physical uplink shared channel (PUSCH).

The measurement value includes a layer 1-reference signal received power (L1-RSRP) and/or a layer 1-signal to interference plus noise ratio (L1-SINR). The first threshold may be specified by a protocol or configured by a network side device; and the second threshold may be specified by a protocol or configured by a network side device.

The reference signal resource indicator includes a channel state information reference signal resource indicator and/or a synchronization signal block resource indicator.

Figure 3:
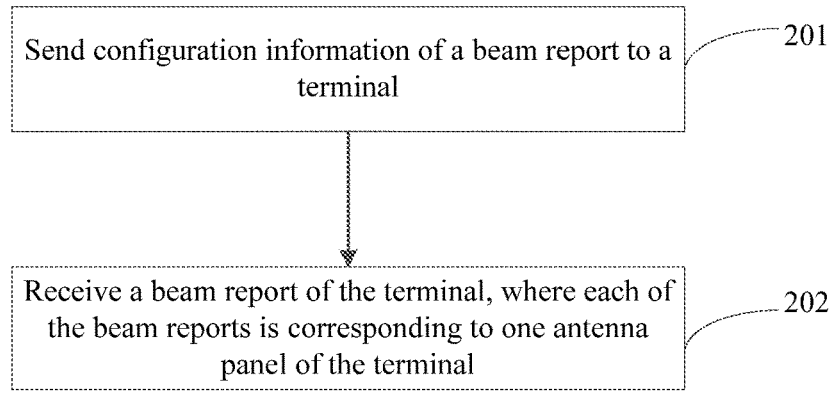
FIG. 3 is a schematic flowchart of a method for receiving a beam report according to an embodiment of this application.

An embodiment of this application further provides a method for receiving a beam report, applied to a network side device. As shown in FIG. 3, the method includes the following steps.

Step 201: Send configuration information of a beam report to a terminal.

Step 202: Receive a beam report of the terminal, where each of the beam reports is corresponding to one antenna panel of the terminal.

In some embodiments, a reportQuantity in the configuration information is set to any of the following: cri-RSRP, ssb-Index-RSRP, csi-SINR, and ssb-Index-SINR.

In some embodiments, the configuration information includes association information of at least two beam reports. The configuration information satisfies at least one of the following:
  the configuration information includes information about the beam report and information about another beam report associated with the beam report;
  the configuration information includes first reference signal resource configuration information associated with the beam report and second reference signal resource configuration information associated with the another beam report;
  reference signal resource configuration information associated with the configuration information includes second reference signal resource configuration information associated with the first reference signal resource;
  the configuration information includes uplink channel resources having an association relationship, and the uplink channel resources are used for transmitting the beam report and the another beam report; and
  in the configuration information, at least two beam reports corresponding to a same index or identifier are associated, or at least two beam reports corresponding to different indexes or identifiers are associated.

The index is an antenna panel index or a transmission and reception point index; and the identifier is an antenna panel identifier or a transmission and reception point identifier.

In some embodiments, that the configuration information includes information about the beam report and information about another beam report associated with the beam report is:
  the configuration information includes report configuration identification information of the another beam report.

In some embodiments, that the configuration information includes first reference signal resource configuration information associated with the beam report and second reference signal resource configuration information associated with the another beam report is:
  the configuration information includes first reference signal resource setting information and second reference signal resource setting information that have an association relationship.

In some embodiments, that reference signal resource configuration information associated with the configuration information includes second reference signal resource configuration information associated with the first reference signal resource is:
  the first reference signal resource configuration information includes second reference signal resource setting information.

In some embodiments, the method further includes:
  sending a reference signal resource for measurement to the terminal based on the configuration information.

The reference signal resource is periodic; or
the reference signal resource is semi-persistent; or
the reference signal resource is aperiodic.

In some embodiments, the configuration information includes an index or identification information of an antenna panel of the terminal corresponding to the beam report, or fourth reference signal resource configuration information associated with the beam report includes an index or identification information of an antenna panel of the terminal.

In some embodiments, in a case that configuration information of at least two beam reports includes an index or identification information of a same antenna panel, the at least two beam reports have an association relationship, or in a case that the configuration information of at least two beam reports does not include an index or identification information of a same antenna panel, the at least two beam reports have no association relationship; or in a case that fourth reference signal resource configuration information associated with at least two beam reports includes an index or identification information of a same antenna panel, the at least two beam reports have an association relationship, or in a case that the fourth reference signal resource configuration information associated with at least two beam reports does not include an index or identification information of a same antenna panel, the at least two beam reports have no association relationship.

Beam reports having an association relationship are corresponding to a same antenna panel of the terminal; and beam reports having no association relationship are corresponding to different antenna panels of the terminal.

The network side device may use the first type beam to send the reference signal resource, or use the second type beam to send the reference signal resource, and for associated at least two beam reports, the sending a reference signal resource to the terminal includes:

sending a reference signal resource associated with some of beam reports by using a first type beam, and sending a reference signal resource associated with another beam report by using a second type beam.

The first type beam may be a wide beam, and the second type beam may be a narrow beam.

The network side device performs, based on the received beam report, beam indication when scheduling a channel or a reference signal. For example, a source reference signal in transmission configuration indication information of a channel or reference signal to be scheduled, or a source reference signal in spatial relation information, or a source reference signal in quasi-co-location information is determined based on a reference signal resource corresponding to a reference signal resource indicator in the beam report.

In some embodiments, the reference signal resource indicator includes a channel state information reference signal resource indicator and/or a synchronization signal block resource indicator.

The network side device may determine a source reference signal in transmission configuration indication information of a first type channel or a reference signal, or a source reference signal in spatial relation information, or a source reference signal in quasi-co-location information based on the reference signal resource that is sent by using the first type beam; and/or determine a source reference signal in transmission configuration indication information of a second type channel or a reference signal, or a source reference signal in spatial relation information, or a source reference signal in quasi-co-location information based on the reference signal resource that is sent by using the second type beam.

In some embodiments, in at least two received beam reports of the terminal, indexes of third reference signal resources corresponding to a reference signal resource indicator are the same, in a case that the at least two beam reports are associated beam reports, beam information of a first type channel or reference signal and beam information of a second type channel or reference signal are determined based on any beam information used for sending the third reference signal resource; or beam information of a first type channel or reference signal and beam information of a second type channel or reference signal are determined based on beam information used for sending the third reference signal resource associated with a first beam report, where the first beam includes a latest beam report in the at least two beam reports; or beam information of a first type channel or reference signal is determined based on first type beam information that is used to send the third reference signal resource, and beam information of a second type channel or reference signal is determined based on second type beam information that is used to send the third reference signal resource; or in a case that the at least two beam reports are unassociated beam reports, beam information of a first type channel or reference signal and beam information of a second type channel or reference signal are determined based on beam information used for sending the third reference signal resource to the terminal for measurement by using a designated antenna panel, where the designated antenna panel is at least one currently activated antenna panel of the terminal or at least one other enabled or activated antenna panel of the terminal, and the other antenna panel is currently inactive antenna panel.

The first type channel or reference signal is a control channel and includes at least one of a physical downlink control channel (PDCCH) and a physical uplink control channel (PUCCH); and the second type channel or reference signal is a traffic channel and includes at least one of a physical downlink shared channel (PDSCH) and a physical uplink shared channel (PUSCH).

In a specific embodiment, the UE is assumed to have two panels. Currently, the UE only activates a panel 1, while a panel 2 is inactive. The network side device configures that CSI-ReportConfig including reportConfigId is A, and CSI-ReportConfig including associated another reportConfigId is B. The CSI-RS resource corresponding to CSI-ReportConfig is aperiodic.

The network side device uses DCI to trigger the CSI-RS resource set, and the network side device uses a wide beam when sending each CSI-RS resource. If a trigger (trigger) offset is less than the preset threshold reported by the UE, the UE uses a receiving beam on the panel 1 to measure L1-RSRP of each CSI-RS resource in the CSI-RS resource set. The UE reports at least one better CRI+L1-RSRP to the network side device based on that reportConfigId is CSI-ReportConfig of A.

The network side device uses the DCI to trigger the CSI-RS resource set again, and the network side device uses a narrow beam when sending each CSI-RS resource. If the trigger offset is also less than the preset threshold reported by the UE, the UE still uses the receiving beam on the panel 1 to measure L1-RSRP of each CSI-RS resource in the CSI-RS resource set. The UE reports at least one better CRI+L1-RSRP to the network side device based on that reportConfigId is CSI-ReportConfig of B.

Based on the association relationship, the network side device may learn that the two beam reports are obtained after the UE performs measurement by using a same panel, and then the network side device may determine QCL information of the control channel (PDCCH) based on a previous beam report. For example, the CSI-RS resource or SSB resource corresponding to CRI and/or SSBRI in the previous beam report is taken as the QCL source of the control channel. In other words, the control channel uses a wide beam. The network side device may also determine QCL information of the traffic channel (PDSCH) based on a latter beam report. For example, the CSI-RS resource or SSB resource corresponding to CRI and/or SSBRI in the latter beam report is taken as the QCL source of the control channel. In other words, the data channel uses a narrow beam.

Likewise, the network side device may also configure reportConfigId as associated beam reports of C and D. When the network side device triggers the aperiodic CSI-RS resource set corresponding to the two beam reports, if the trigger offset is larger than the preset threshold reported by the UE, the UE may enable or activate the panel 2, and use a receiving beam on the panel 2 to measure the L1-RSRP of each CSI-RS resource in the CSI-RS resource set. The UE reports the two beam reports based on that reportConfigId is CSI-ReportConfig of C and D, where one beam report is a measurement result for the wide beam, and the other beam report is a measurement result for the narrow beam. Therefore, the network side device may learn to determine QCL information of the control channel and the data channel based on two associated beam reports.

It should be noted that, the method for sending a beam report provided in the embodiments of this application can be performed by an apparatus for sending a beam report or a module in the apparatus for sending a beam report that is used to load the method for sending a beam report. In this embodiment of this application, the method for sending a beam report provided in this embodiment of this application is described with an example in which the apparatus for sending a beam report loads the method for sending a beam report.

Figure 4:
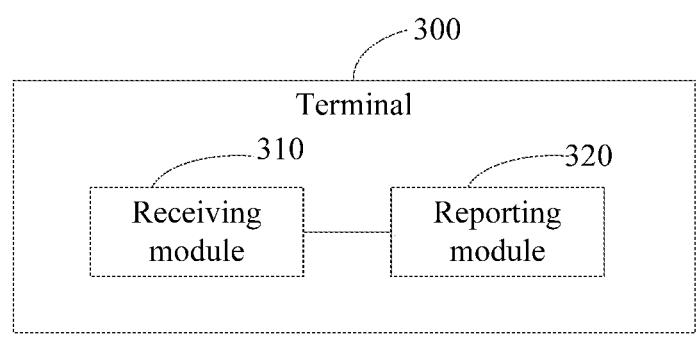
FIG. 4 is a schematic structural diagram of an apparatus for sending a beam report according to an embodiment of this application.

The apparatus for sending a beam report in the embodiments of this application is applied to a terminal 300. As shown in FIG. 4, the apparatus includes:
 a receiving module 310, configured to receive configuration information of a beam report sent by a network side device; and
 a reporting module 320, configured to report a beam report to the network side device based on the configuration information, where each of the beam reports is corresponding to one antenna panel of the terminal.

In the embodiments of this application, the terminal sends the beam report to the network side device based on the configuration information of the beam report of the network side device, and each beam report is corresponding to one antenna panel of the terminal. In this way, the network side device can learn the antenna panel of the terminal corresponding to the beam report even if the index or identifier of the antenna panel is not carried in the beam report. Thus, signaling overhead can be saved, and the network can accurately learn the antenna panel of the terminal corresponding to the beam report, which facilitates scheduling data transmission.

In some embodiments, a reportQuantity in the configuration information is set to any of the following: cri-RSRP, ssb-Index-RSRP, csi-SINR, and ssb-Index-SINR.

In some embodiments, each of the beam reports is a beam report in each beam report instance.

In some embodiments, the configuration information includes association information of at least two beam reports.

In some embodiments, the configuration information satisfies at least one of the following:
 the configuration information includes information about the beam report and information about another beam report associated with the beam report;
 the configuration information includes first reference signal resource configuration information associated with the beam report and second reference signal resource configuration information associated with the another beam report;
 reference signal resource configuration information associated with the configuration information includes second reference signal resource configuration information associated with the first reference signal resource;
 the configuration information includes uplink channel resources having an association relationship, and the uplink channel resources are used for transmitting the beam report and the another beam report; and
 in the configuration information, at least two beam reports corresponding to a same index or identifier are associated, or at least two beam reports corresponding to different indexes or identifiers are associated.

In some embodiments, that the configuration information includes information about the beam report and information about another beam report associated with the beam report is:
 the configuration information includes report configuration identification information of the another beam report.

In some embodiments, that the configuration information includes first reference signal resource configuration information associated with the beam report and second reference signal resource configuration information associated with the another beam report is:
 the configuration information includes first reference signal resource setting information and second reference signal resource setting information.

In some embodiments, that reference signal resource configuration information associated with the configuration information includes second reference signal resource configuration information associated with the first reference signal resource is:
 the first reference signal resource configuration information includes second reference signal resource setting information.

In some embodiments, the index is an antenna panel index or a transmission and reception point index; and
 the identifier is an antenna panel identifier or a transmission and reception point identifier.

In some embodiments, beam reports transmitted on uplink channel resources having an association relationship are associated.

In some embodiments, the association relationship between the uplink channel resources is established by using at least one of the following pieces of first information in the configuration information:
 a resource identifier of an uplink channel resource;
 a period value of an uplink channel resource;
 an offset value of an uplink channel resource;
 a resource location of an uplink channel resource;
 spatial relation information of an uplink channel resource;
 a format of an uplink channel resource; and
 scrambling code of an uplink channel resource.

In some embodiments, when same first information of at least two uplink channel resources uses different values, beam reports carried by the at least two uplink channel resources are associated; or
 when same first information of at least two uplink channel resources uses a same value, beam reports carried by the at least two uplink channel resources are associated.

In some embodiments, the receiving module 310 is further configured to: receive a reference signal resource sent by the network side device based on the configuration information, and measure the reference signal resource; and the reporting module 310 is further configured to send a beam report based on a measurement result obtained by measuring the reference signal resource.

In some embodiments, the reference signal resource is periodic; or the reference signal resource is semi-persistent; or the reference signal resource is aperiodic.

In some embodiments, the reference signal resource is periodic or semi-persistent, in a case that a period value of the reference signal resource is greater than or equal to a switching duration of an antenna panel of the terminal, the terminal uses at least one currently activated antenna panel to measure the reference signal resource; or at least one other antenna panel is enabled or activated to measure the reference signal resource, and the other antenna panel is currently inactive antenna panel; and in a case that a period value of the reference signal resource is less than a switching duration of an antenna panel of the terminal, the terminal uses at least one currently activated antenna panel to measure the reference signal resource.

In some embodiments, the reference signal resource is aperiodic, in a case that a trigger offset value obtained when the network side device triggers the reference signal resource is greater than or equal to a switching duration of an antenna panel of the terminal, the terminal uses at least one currently activated antenna panel to measure the reference signal resource; or at least one other antenna panel is enabled or activated to measure the reference signal resource, and the other antenna panel is currently inactive antenna panel; and in a case that a trigger offset value obtained when the network side device triggers the reference signal resource is less than a switching duration of an antenna panel of the terminal, the terminal uses at least one currently activated antenna panel to measure the reference signal resource.

In some embodiments, the configuration information includes an index or identification information of an antenna panel of the terminal corresponding to the beam report, or fourth reference signal resource configuration information associated with the beam report includes an index or identification information of an antenna panel of the terminal.

In some embodiments, in a case that configuration information of at least two beam reports includes an index or identification information of a same antenna panel, the at least two beam reports have an association relationship, or in a case that the configuration information of at least two beam reports does not include an index or identification information of a same antenna panel, the at least two beam reports have no association relationship; or in a case that fourth reference signal resource configuration information associated with at least two beam reports includes an index or identification information of a same antenna panel, the at least two beam reports have an association relationship, or in a case that the fourth reference signal resource configuration information associated with at least two beam reports does not include an index or identification information of a same antenna panel, the at least two beam reports have no association relationship.

In some embodiments, beam reports having an association relationship are corresponding to a same antenna panel of the terminal; and beam reports having no association relationship are corresponding to different antenna panels of the terminal.

In some embodiments, the beam report is reported after the terminal measures a reference signal resource by using one antenna panel.

In some embodiments, the antenna panel is an active antenna panel and/or an inactive antenna panel.

In some embodiments, in at least two beam reports reported by the terminal, indexes of third reference signal resources corresponding to a reference signal resource indicator are the same, in a case that the at least two beam reports are associated beam reports, the terminal determines beam information of a first type channel or reference signal and beam information of a second type channel or reference signal based on any beam information used for measuring the third reference signal resource; or determines beam information of a first type channel or reference signal and beam information of a second type channel or reference signal based on beam information used for measuring the third reference signal resource associated with a first beam report, where the first beam includes a latest beam report in the at least two beam reports; or determines beam information of a first type channel or reference signal based on beam information that is used when a measurement value is lower than a first threshold in measuring the third reference signal resource, and determines beam information of a second type channel or reference signal based on beam information that is used when a measurement value is higher than a second threshold; or in a case that the at least two beam reports are unassociated beam reports, the terminal determines beam information of a first type channel or reference signal and beam information of a second type channel or reference signal based on beam information that is on at least one currently activated antenna panel and that is used for measuring the third reference signal resource, or determines beam information of a first type channel or reference signal and beam information of a second type channel or reference signal based on beam information that is on at least one other enabled or activated antenna panel and that is used for measuring the third reference signal resource, where the other antenna panel is currently inactive antenna panel.

The first type channel or reference signal is a control channel and includes at least one of a physical downlink control channel (PDCCH) and a physical uplink control channel (PUCCH); and the second type channel or reference signal is a traffic channel and includes at least one of a physical downlink shared channel (PDSCH) and a physical uplink shared channel (PUSCH).

In some embodiments, the measurement value includes a layer 1-reference signal received power (L1-RSRP) and/or a layer 1-signal to interference plus noise ratio (L1-SINR).

In some embodiments, the first threshold is specified by a protocol or configured by a network side device; and the second threshold is specified by a protocol or configured by a network side device.

In some embodiments, the reference signal resource indicator includes a channel state information reference signal resource indicator and/or a synchronization signal block resource indicator.

The apparatus for sending a beam report in this embodiment of this application may be an apparatus, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a network attached storage (NAS), a personal computer (PC), a television (TV), a teller machine, a self-service machine, or the like. This is not specifically limited in the embodiments of this application.

The apparatus for sending a beam report in this embodiment of this application may be an apparatus with an operating system. The operating system may be an Android (Android) operating system, an iOS operating system, or another possible operating system, which is not specifically limited in the embodiments of this application.

The apparatus for sending a beam report provided in this embodiment of this application can implement processes of the method for sending a beam report in the method embodiment of FIG. 2. To avoid repetition, details are not described herein again.

It should be noted that, the method for receiving a beam report provided in the embodiments of this application can be performed by an apparatus for receiving a beam report or a module in the apparatus for receiving a beam report that is used to load the method for receiving a beam report. In this embodiment of this application, the method for receiving a beam report provided in this embodiment of this application is described with an example in which the apparatus for receiving a beam report loads the method for receiving a beam report.

Figure 5:
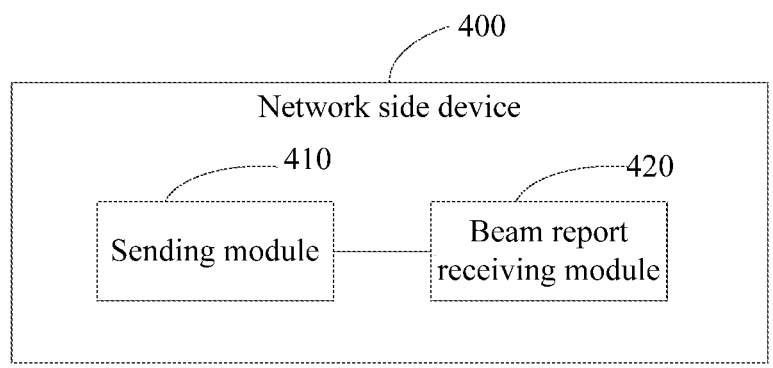
FIG. 5 is a schematic structural diagram of an apparatus for receiving a beam report according to an embodiment of this application.

The apparatus for receiving a beam report in the embodiments of this application is applied to a network side device 400. As shown in FIG. 5, the apparatus includes:
- a sending module 410, configured to send configuration information of a beam report to a terminal; and
- a beam report receiving module 420, configured to receive a beam report of the terminal, where each of the beam reports is corresponding to one antenna panel of the terminal.

In some embodiments, a reportQuantity in the configuration information is set to any of the following: cri-RSRP, ssb-Index-RSRP, csi-SINR, and ssb-Index-SINR.

In some embodiments, the configuration information includes association information of at least two beam reports.

In some embodiments, the configuration information satisfies at least one of the following:
- the configuration information includes information about the beam report and information about another beam report associated with the beam report;
- the configuration information includes first reference signal resource configuration information associated with the beam report and second reference signal resource configuration information associated with the another beam report;
- reference signal resource configuration information associated with the configuration information includes second reference signal resource configuration information associated with the first reference signal resource;
- the configuration information includes uplink channel resources having an association relationship, and the uplink channel resources are used for transmitting the beam report and the another beam report; and
- in the configuration information, at least two beam reports corresponding to a same index or identifier are associated, or at least two beam reports corresponding to different indexes or identifiers are associated.

In some embodiments, that the configuration information includes information about the beam report and information about another beam report associated with the beam report is:
- the configuration information includes report configuration identification information of the another beam report.

In some embodiments, that the configuration information includes first reference signal resource configuration information associated with the beam report and second reference signal resource configuration information associated with the another beam report is:
- the configuration information includes first reference signal resource setting information and second reference signal resource setting information that have an association relationship.

In some embodiments, that reference signal resource configuration information associated with the configuration information includes second reference signal resource configuration information associated with the first reference signal resource is:
- the first reference signal resource configuration information includes second reference signal resource setting information.

In some embodiments, the index is an antenna panel index or a transmission and reception point index; and
- the identifier is an antenna panel identifier or a transmission and reception point identifier.

In some embodiments, the sending module is further configured to send a reference signal resource for measurement to the terminal based on the configuration information.

In some embodiments, the reference signal resource is periodic; or
- the reference signal resource is semi-persistent; or
- the reference signal resource is aperiodic.

In some embodiments, the configuration information includes an index or identification information of an antenna panel of the terminal corresponding to the beam report, or fourth reference signal resource configuration information associated with the beam report includes an index or identification information of an antenna panel of the terminal.

In some embodiments, in a case that configuration information of at least two beam reports includes an index or identification information of a same antenna panel, the at least two beam reports have an association relationship, or in a case that the configuration information of at least two beam reports does not include an index or identification information of a same antenna panel, the at least two beam reports have no association relationship; or
- in a case that fourth reference signal resource configuration information associated with at least two beam reports includes an index or identification information of a same antenna panel, the at least two beam reports have an association relationship, or in a case that the fourth reference signal resource configuration information associated with at least two beam reports does not include an index or identification information of a same antenna panel, the at least two beam reports have no association relationship.

In some embodiments, beam reports having an association relationship are corresponding to a same antenna panel of the terminal; and
- beam reports having no association relationship are corresponding to different antenna panels of the terminal.

In some embodiments, the sending module is further configured to send a reference signal resource associated with some of beam reports by using a first type beam, and sending a reference signal resource associated with another beam report by using a second type beam.

In some embodiments, the first type beam is a wide beam, and the second type beam is a narrow beam.

In some embodiments, the apparatus further includes:

a determining module, configured to determine a source reference signal in transmission configuration indication information of a channel or reference signal to be scheduled, or a source reference signal in spatial relation information, or a source reference signal in quasi-co-location information is determined based on a reference signal resource corresponding to a reference signal resource indicator in the beam report.

In some embodiments, the reference signal resource indicator includes a channel state information reference signal resource indicator and/or a synchronization signal block resource indicator.

In some embodiments, the determining module is further configured to determine a source reference signal in transmission configuration indication information of a first type channel or a reference signal, or a source reference signal in spatial relation information, or a source reference signal in quasi-co-location information based on the reference signal resource that is sent by using the first type beam; and a source reference signal in transmission configuration indication information of a second type channel or a reference signal, or a source reference signal in spatial relation information, or a source reference signal in quasi-co-location information is determined based on the reference signal resource that is sent by using the second type beam.

In some embodiments, in at least two received beam reports of the terminal, indexes of third reference signal resources corresponding to a reference signal resource indicator are the same, the determining module is further configured to: in a case that the at least two beam reports are associated beam reports, determine beam information of a first type channel or reference signal and beam information of a second type channel or reference signal based on any beam information used for sending the third reference signal resource; or determine beam information of a first type channel or reference signal and beam information of a second type channel or reference signal based on beam information used for sending the third reference signal resource associated with a first beam report, where the first beam includes a latest beam report in the at least two beam reports; or determine beam information of a first type channel or reference signal based on first type beam information that is used to send the third reference signal resource, and determine beam information of a second type channel or reference signal based on second type beam information that is used to send the third reference signal resource; or in a case that the at least two beam reports are unassociated beam reports, determine beam information of a first type channel or reference signal and beam information of a second type channel or reference signal based on beam information used for sending the third reference signal resource to the terminal for measurement by using a designated antenna panel, where the designated antenna panel is at least one currently activated antenna panel of the terminal or at least one other enabled or activated antenna panel of the terminal, and the other antenna panel is currently inactive antenna panel.

In some embodiments, the first type channel or reference signal is a control channel and includes at least one of a physical downlink control channel (PDCCH) and a physical uplink control channel (PUCCH); and the second type channel or reference signal is a traffic channel and includes at least one of a physical downlink shared channel (PDSCH) and a physical uplink shared channel (PUSCH).

The apparatus for receiving a beam report in this embodiment of this application may be an apparatus, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a network attached storage (NAS), a personal computer (PC), a television (TV), a teller machine, a self-service machine, or the like. This is not specifically limited in the embodiments of this application.

The apparatus for receiving a beam report in this embodiment of this application may be an apparatus with an operating system. The operating system may be an Android (Android) operating system, an iOS operating system, or another possible operating system, which is not specifically limited in the embodiments of this application.

The apparatus for receiving a beam report provided in this embodiment of this application can implement processes of the method for receiving a beam report in the method embodiment of FIG. 3. To avoid repetition, details are not described herein again.

Optionally, an embodiment of this application further provides an electronic device, including a processor, a memory, and a program or an instruction stored in the memory and executable on the processor. When the program or the instruction is executed by the processor, the processes of the foregoing embodiments of the method for sending or receiving a beam report are implemented, and a same technical effect can be achieved. To avoid repetition, details are not described herein again.

It should be noted that the electronic device in this embodiment of this application includes the foregoing mobile electronic device and the foregoing non-mobile electronic device.

Figure 6:
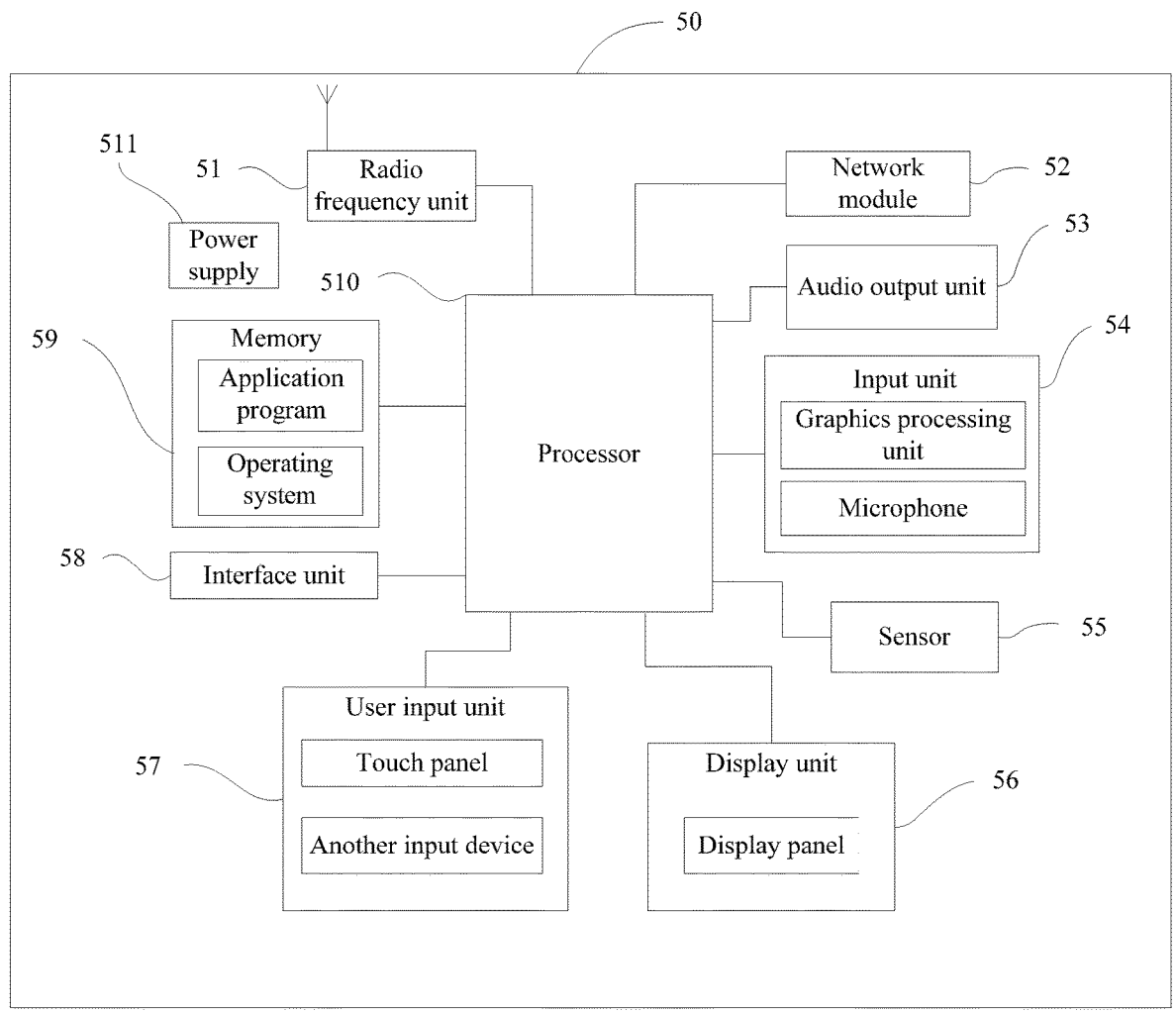
FIG. 6 is a schematic diagram of composition of a terminal according to an embodiment of this application.

The electronic device in this embodiment may be a terminal. FIG. 6 is a schematic diagram of a hardware structure of a terminal according to the embodiments of this application. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511.

It can be understood by a person skilled in the art that, the terminal structure shown in FIG. 6 does not constitute any limitation on the terminal, and the terminal may include more or fewer components than those shown in the figure, or combine some components, or have different component arrangements. In this embodiment of this application, the terminal includes but is not limited to a mobile phone, a tablet computer, a notebook computer, a palmtop computer, an in-vehicle terminal, a wearable device, a pedometer, and the like.

It should be understood that, in this embodiment of this application, the radio frequency unit 51 may be configured to receive and send information or a signal in a call process.

Alternatively, after receiving downlink data from a base station, the radio frequency unit 51 sends the downlink data to the processor 510 for processing. In addition, the radio frequency unit 51 sends uplink data to the base station. Usually, the radio frequency unit 51 includes but is not limited to an antenna, at least one amplifier, a transceiver, a coupler, a low noise amplifier, a duplexer, and the like. In addition, the radio frequency unit 51 may further communicate with a network and another device through a wireless communications system.

The memory 59 may be configured to store a software program and various pieces of data. The memory 59 may mainly include a program storage region and a data storage region. The program storage region may store an operating system, an application program required by at least one function (such as a sound play function or an image play function), and the like. The data storage region may store data (such as audio data or an address book) created based on use of the mobile phone, and the like. In addition, the memory 59 may include a high-speed random access memory, and may further include a nonvolatile memory, for example, at least one magnetic disk storage device, a flash storage device, or another volatile solid-state storage device.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or more processing units. Preferably, an application processor and a modem processor may be integrated into the processor 510. The application processor mainly processes an operating system, a user interface, an application program, and the like. The modem processor mainly processes wireless communications. It can be understood that, alternatively, the modem processor may not be integrated into the processor 510.

The terminal 50 may further include the power supply 511 (such as a battery) that supplies power to each component. Preferably, the power supply 511 may be logically connected to the processor 510 by using a power management system, so as to implement functions such as charging, discharging, and power consumption management by using the power management system.

In addition, the terminal 50 includes some function modules not shown, and details are not described herein.

Figure 7:
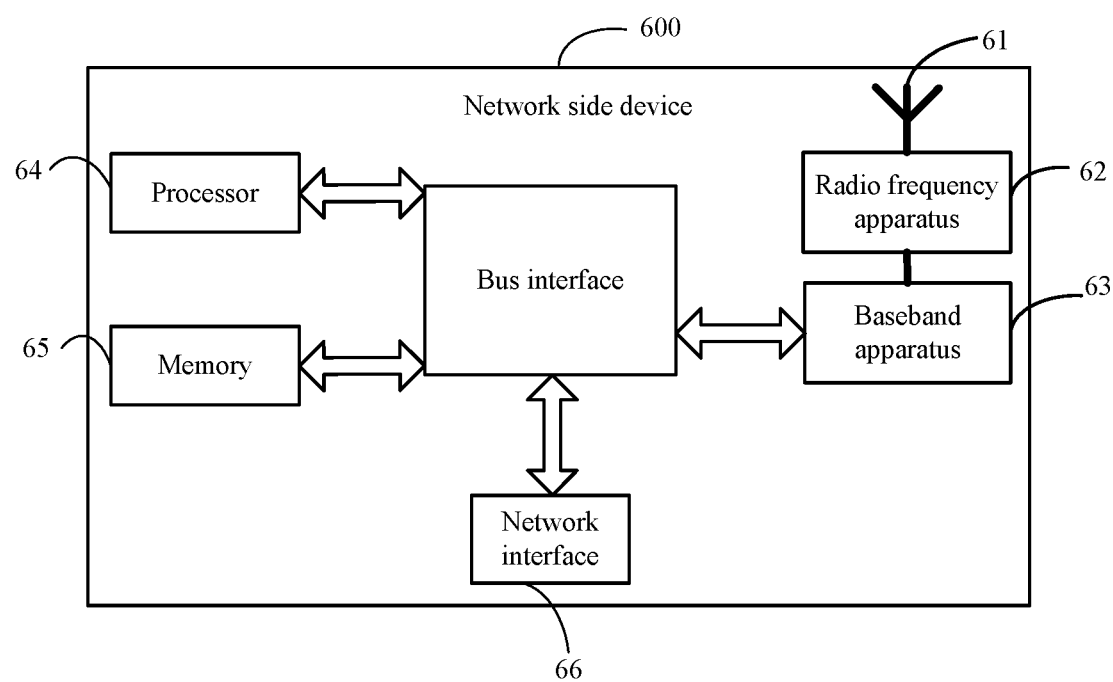
FIG. 7 is a schematic diagram of composition of a network side device according to an embodiment of this application.

The electronic device in this embodiment may also be a network side device. As shown in FIG. 7, the network side device 600 includes an antenna 61, a radio frequency apparatus 62, and a baseband apparatus 63. The antenna 61 is connected to the radio frequency apparatus 62. In an uplink direction, the radio frequency apparatus 62 receives information by using the antenna 61, and sends the received information to the baseband apparatus 63 for processing. In a downlink direction, the baseband apparatus 63 processes to-be-sent information, and sends the to-be-sent information to the radio frequency apparatus 62. After processing the received information, the radio frequency apparatus 62 sends the information by using the antenna 61.

The frequency band processing apparatus may be located in the baseband apparatus 63. The method performed by the network side device in the foregoing embodiment may be implemented in the baseband apparatus 63. The baseband apparatus 63 includes a processor 64 and a memory 65.

For example, the baseband apparatus 63 may include at least one baseband board. Multiple chips are disposed on the baseband board. As shown in FIG. 7, one chip is, for example, the processor 64, and is connected to the memory 65, to invoke a program in the memory 65 to perform an operation of the network side device shown in the foregoing method embodiment.

The baseband apparatus 63 may further include a network interface 66, configured to exchange information with the radio frequency apparatus 62. For example, the interface is a common public radio interface (CPRI).

The processor herein may be one processor, or may be a general name of a plurality of processing elements. For example, the processor may be a CPU, or may be an ASIC, or one or more integrated circuits configured to implement the method performed by the foregoing network side device, for example, one or more microprocessors (DSP), or one or more field programmable gate arrays (FPGA). A storage element may be a memory, or may be a general term of a plurality of storage elements.

The memory 65 may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example rather than limitative description, RAMs in many forms may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchlink dynamic random access memory (SLDRAM), and a direct rambus random access memory DRRAM). The memory 65 described in this specification is intended to include but is not limited to these memories and any memory of another proper type.

An embodiment of this application further provides a readable storage medium, where the readable storage medium stores a program or an instruction, and when the program or the instruction is executed by a processor, the processes of the foregoing embodiments of the method for sending or receiving a beam report are implemented, and a same technical effect can be achieved. To avoid repetition, details are not described herein again.

The processor is a processor in the electronic device in the foregoing embodiment. The readable storage medium includes a computer-readable storage medium such as a read-only memory (ROM), a random access memory (RAM), a magnetic disk, an optical disc, or the like.

An embodiment of this application also provides a chip. The chip includes a processor and a communications interface, and the communications interface is coupled to the processor. The processor is configured to run a program or an instruction to implement the processes of the foregoing embodiments of the method for sending or receiving a beam report, and a same technical effect can be achieved. To avoid repetition, details are not described herein again.

It should be understood that the chip mentioned in this embodiment of this application may also be referred to as a system-level chip, a system chip, a chip system, or an on-chip system chip.

It can be understood that the embodiments described in the present disclosure may be implemented by hardware, software, firmware, middleware, microcode, or a combination thereof. For implementation with hardware, the module, unit, submodule, and subunit may be implemented in one or more application specific integrated circuits (ASIC), a digital signal processor (DSP), a digital signal processing device (DSPD), a programmable logic device (PLD), a field-programmable gate array (FPGA), a general purpose processor, a controller, a microcontroller, a microprocessor, another electronic unit configured to perform the functions described in this application, or a combination thereof.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. A method for sending a beam report performed by a terminal, comprising:
   receiving configuration information of a beam report sent by a network side device; and
   reporting a—beam report reports to the network side device based on the configuration information, wherein each of the beam reports is corresponding to one antenna panel of the terminal
   wherein the configuration information comprises association information of at least two beam reports;
   beam reports having an association relationship are corresponding to a same antenna panel of the terminal; and
   beam reports having no association relationship are corresponding to different antenna panels of the terminal.

2. The method for sending a beam report according to claim 1, wherein a reportQuantity in the configuration information is set to any of the following: cri-RSRP, ssb-Index-RSRP, csi-SINR, and ssb-Index-SINR.

3. The method for sending a beam report according to claim 1, wherein each of the beam reports is a beam report in each beam report instance.

4. The method for sending a beam report according to claim 1, wherein the configuration information satisfies at least one of the following:
   the configuration information comprises information about the beam report and information about another beam report associated with the beam report;
   the configuration information comprises first reference signal resource configuration information associated with the beam report and second reference signal resource configuration information associated with the another beam report;
   reference signal resource configuration information associated with the configuration information comprises second reference signal resource configuration information associated with the first reference signal resource;
   the configuration information comprises uplink channel resources having an association relationship, and the uplink channel resources are used for transmitting the beam report and the another beam report; or
   in the configuration information, at least two beam reports corresponding to a same index or identifier are associated, or at least two beam reports corresponding to different indexes or identifiers are associated.

5. The method for sending a beam report according to claim 4, wherein that the configuration information comprises information about the beam report and information about another beam report associated with the beam report is:
   the configuration information comprises report configuration identification information of the another beam report.

6. The method for sending a beam report according to claim 4, wherein that the configuration information comprises first reference signal resource configuration information associated with the beam report and second reference signal resource configuration information associated with the another beam report is:
   the configuration information comprises first reference signal resource setting information and second reference signal resource setting information.

7. The method for sending a beam report according to claim 4, wherein that reference signal resource configuration information associated with the configuration information comprises second reference signal resource configuration information associated with the first reference signal resource is:
   the first reference signal resource configuration information comprises second reference signal resource setting information.

8. The method for sending a beam report according to claim 4, wherein
   the index is an antenna panel index or a transmission and reception point index;
   and the identifier is an antenna panel identifier or a transmission and reception point identifier.

9. The method for sending a beam report according to claim 4, wherein beam reports transmitted on uplink channel resources having an association relationship are associated.

10. The method for sending a beam report according to claim 4, wherein the association relationship between the uplink channel resources is established by using at least one of the following pieces of first information in the configuration information:
a resource identifier of an uplink channel resource;
a period value of an uplink channel resource;
an offset value of an uplink channel resource;
a resource location of an uplink channel resource;
spatial relation information of an uplink channel resource;
a format of an uplink channel resource; and
scrambling code of an uplink channel resource.

11. The method for sending a beam report according to claim 1, further comprising:
receiving a reference signal resource sent by the network side device based on the configuration information, and measuring the reference signal resource; and
the reporting a beam report to the network side device based on the configuration information comprises:
sending a beam report based on a measurement result obtained by measuring the reference signal resource.

12. The method for sending a beam report according to claim 11,
wherein the reference signal resource is periodic; or
the reference signal resource is semi-persistent; or
the reference signal resource is aperiodic.

13. The method for sending a beam report according to claim 1, wherein the configuration information comprises an index or identification information of an antenna panel of the terminal corresponding to the beam report, or fourth reference signal resource configuration information associated with the beam report comprises an index or identification information of an antenna panel of the terminal.

14. The method for sending a beam report according to claim 13, wherein
in a case that configuration information of at least two beam reports comprises an index or identification information of a same antenna panel, the at least two beam reports have an association relationship, or in a case that the configuration information of at least two beam reports does not comprise an index or identification information of a same antenna panel, the at least two beam reports have no association relationship; or
in a case that fourth reference signal resource configuration information associated with at least two beam reports comprises an index or identification information of a same antenna panel, the at least two beam reports have an association relationship, or in a case that the fourth reference signal resource configuration information associated with at least two beam reports does not comprise an index or identification information of a same antenna panel, the at least two beam reports have no association relationship.

15. The method for sending a beam report according to claim 1, wherein the beam report is reported after the terminal measures a reference signal resource by using one antenna panel.

16. The method for sending a beam report according to claim 1, wherein the antenna panel is an active antenna panel and/or an inactive antenna panel.

17. The method for sending a beam report according to claim 1, wherein in at least two beam reports reported by the terminal, indexes of third reference signal resources corresponding to a reference signal resource indicator are the same,
in a case that the at least two beam reports are associated beam reports, the terminal determines beam information of a first type channel or reference signal and beam information of a second type channel or reference signal based on any beam information used for measuring the third reference signal resource; or determines beam information of a first type channel or reference signal and beam information of a second type channel or reference signal based on beam information used for measuring the third reference signal resource associated with a first beam report, wherein the first beam comprises a latest beam report in the at least two beam reports; or determines beam information of a first type channel or reference signal based on beam information that is used when a measurement value is lower than a first threshold in measuring the third reference signal resource, and determines beam information of a second type channel or reference signal based on beam information that is used when a measurement value is higher than a second threshold; or
in a case that the at least two beam reports are unassociated beam reports, the terminal determines beam information of a first type channel or reference signal and beam information of a second type channel or reference signal based on beam information that is on at least one currently activated antenna panel and that is used for measuring the third reference signal resource, or determines beam information of a first type channel or reference signal and beam information of a second type channel or reference signal based on beam information that is on at least one other enabled or activated antenna panel and that is used for measuring the third reference signal resource, wherein the other antenna panel is currently inactive antenna panel.

18. An electronic device, comprising:
a processor; and
a memory storing a program or an instruction that is executable on the processor, wherein the program or the instruction, when executed by the processor, causes the electronic device to:
receive configuration information of a beam report sent by a network side device; and
report a—beam report reports to the network side device based on the configuration information, wherein each of the beam reports is corresponding to one antenna panel of the terminal
wherein the configuration information comprises association information of at least two beam reports;
beam reports having an association relationship are corresponding to a same antenna panel of the terminal; and
beam reports having no association relationship are corresponding to different antenna panels of the terminal.

19. An electronic device, comprising:
a processor; and
a memory storing a program or an instruction that is executable on the processor, wherein the program or the instruction, when executed by the processor, causes the electronic device to:
send configuration information of a beam report to a terminal; and
receive a—beam report reports of the terminal, wherein each of the beam reports is corresponding to one antenna panel of the terminal wherein the configuration information comprises association information of at least two beam reports;

beam reports having an association relationship are corresponding to a same antenna panel of the terminal; and beam reports having no association relationship are corresponding to different antenna panels of the terminal.

\* \* \* \* \*